United States Patent
Robb et al.

(10) Patent No.: US 9,127,172 B2
(45) Date of Patent: Sep. 8, 2015

(54) TITANIUM DIOXIDE

(75) Inventors: John Robb, Stockton on Tees (GB); John L. Edwards, Durham (GB); John Temperley, Stockon on Tees (GB); Robert Bird, Middlesbrough (GB); Paul C. Bradley, Stockton on Tees (GB); Anthony G. Jones, Stockton on Tees (GB)

(73) Assignee: TIOXIDE EUROPE LIMITED, Wynyard Park, Stockton-on-Tees (GB)

( * ) Notice: Subject to any disclaimer, the term of this patent is extended or adjusted under 35 U.S.C. 154(b) by 234 days.

(21) Appl. No.: 12/935,600

(22) PCT Filed: May 1, 2009

(86) PCT No.: PCT/GB2009/001096
§ 371 (c)(1),
(2), (4) Date: Sep. 30, 2010

(87) PCT Pub. No.: WO2009/136141
PCT Pub. Date: Nov. 12, 2009

(65) Prior Publication Data
US 2011/0041726 A1    Feb. 24, 2011

(30) Foreign Application Priority Data

May 7, 2008  (GB) .................................. 0808239.8
Aug. 8, 2008  (GB) .................................. 0814515.3

(51) Int. Cl.
*C09D 1/00*    (2006.01)
*C09D 11/00*   (2014.01)
(Continued)

(52) U.S. Cl.
CPC ............ *C09D 5/032* (2013.01); *C01G 23/0532* (2013.01); *C09C 1/3661* (2013.01);
(Continued)

(58) Field of Classification Search
None
See application file for complete search history.

(56) References Cited

U.S. PATENT DOCUMENTS 3,632,527 A * 1/1972 Alpert et al. .................. 430/88
4,125,412 A * 11/1978 West ............................ 106/446
(Continued)

FOREIGN PATENT DOCUMENTS

EP    0 474 357    3/1992
EP    0 573 150    12/1993
(Continued)

OTHER PUBLICATIONS

Diebold, M. P. "The Causes and Prevention of Titanium Dioxide Photodegradation of Paints" *Surface Coatings International* 1995 (7) pp. 294-299.
(Continued)

*Primary Examiner* — Ronak Patel
(74) *Attorney, Agent, or Firm* — Monique M. Raub

(57) ABSTRACT

A colored composition comprising: a) NIR scattering $TiO_2$ particulate material with an average crystal size of greater than 0.40 μm and a particle size distribution such that 30% or more of the particles are less than 1 μm; b) one or more non-white colorant; wherein the particulate material and the non-white colorant are dispersed within a vehicle. This material with a large crystal size has unusually high reflection of NIR radiation and, simultaneously, noticeably diminished reflectance of visible light. Also disclosed is a coated particulate $TiO_2$ material, wherein the material has an average crystal size of greater than 0.40 μm, and the coating comprises one or more oxide material; this provides low levels of photocatalytic activity that were previously unattainable. This coated $TiO_2$ material may be provided in a composition.

13 Claims, 4 Drawing Sheets

(51) Int. Cl.
*C09D 5/03* (2006.01)
*C01G 23/053* (2006.01)
*C09C 1/36* (2006.01)
*C09D 5/33* (2006.01)
*C09D 7/12* (2006.01)
*C09D 11/037* (2014.01)
*C08K 3/22* (2006.01)

(52) U.S. Cl.
CPC ............. *C09D 5/004* (2013.01); *C09D 7/1216* (2013.01); *C09D 7/1275* (2013.01); *C09D 7/1283* (2013.01); *C09D 11/037* (2013.01); *C01P 2004/03* (2013.01); *C01P 2004/51* (2013.01); *C01P 2004/62* (2013.01); *C01P 2006/62* (2013.01); *C01P 2006/63* (2013.01); *C01P 2006/64* (2013.01); *C08K 3/22* (2013.01)

(56) References Cited

U.S. PATENT DOCUMENTS

| | | | |
|---|---|---|---|
| 4,447,271 | A | 5/1984 | Howard et al. |
| 5,147,629 | A | 9/1992 | Robb et al. |
| 5,509,960 | A | 4/1996 | Simpson et al. |
| 6,235,270 | B1 | 5/2001 | Ishii et al. |
| 6,534,044 | B1 | 3/2003 | Wada et al. |
| 6,572,694 | B2 * | 6/2003 | Towe .................... 106/464 |
| 7,157,112 | B2 | 1/2007 | Haines |
| 2006/0204456 | A1 | 9/2006 | Asakura |
| 2007/0028806 | A1 * | 2/2007 | Piro et al. .................... 106/446 |
| 2007/0065640 | A1 | 3/2007 | Joedicke |
| 2007/0065641 | A1 | 3/2007 | Joedicke |
| 2008/0008832 | A1 | 1/2008 | Shiao et al. |

FOREIGN PATENT DOCUMENTS

| | | |
|---|---|---|
| EP | 0 595 471 | 5/1994 |
| EP | 0 782 971 | 7/1997 |
| EP | 0 988 853 | 3/2000 |
| EP | 0 654 509 B1 | 1/2001 |
| EP | 1 167 462 | 1/2002 |
| EP | 1 580 166 | 9/2005 |
| GB | 1 103 078 | 2/1968 |
| GB | 2 291 052 | 1/1996 |
| GB | 2 293 175 | 3/1996 |
| JP | 58-84863 | 5/1983 |
| JP | 6 107 417 | 4/1994 |
| JP | 2005 330466 | 12/2005 |
| JP | 2008-081578 | 4/2008 |
| WO | WO 2005/095528 | 10/2005 |

OTHER PUBLICATIONS

Holtzen, Dwight A., et al. "TiO2 Photochemistry and Color Applications" *ANTEC* 2001 pp. 2374-2378.

Weber, Helmut, "Kieselsaure als Bestandteil der Titandioxidpigmente", *KRONOS INFORMATION* 6.1, FATIPEC—Kongressbuch 1978.

Notice of Opposition Oct. 29, 2012 by Kronos International Inc. to European Patent 2 285 912.

Notice of Opposition Oct. 29, 2012 by Kronos International Inc. to European Patent 2 285 912 (Translation of document submitted in Supplemental IDS on Nov. 13, 2012).

Weber, Helmut, "Kieselsaure als Bestandteil der Titandioxidpigmente", *KRONOS INFORMATION* 6.1, FATIPEC—Kongressbuch 1978 (Translation of document submitted in Supplemental IDS on Nov. 13, 2012).

* cited by examiner

TITANIUM DIOXIDE

CROSS-REFERENCE TO RELATED APPLICATIONS

This application is the National Phase of International Application PCT/GB2009/001096 filed May 1, 2009 which designated the U.S. and which claims priority to Great Britain App. Serial No. 0808239.8 filed May 7, 2008 and Great Britain App. Serial No. 0814515.3 filed Aug. 8, 2008. The noted applications are incorporated herein by reference.

Embodiments of the present invention relate generally to titanium dioxide and more particularly to titanium dioxide particulate materials and compositions.

In some embodiments, titanium dioxide or doped titanium dioxide particulate material scatters infrared radiation efficiently in the near infrared (NIR) region of the spectrum. In an embodiment of a composition, the particulate material is combined with a non-white colorant having low absorption in the NIR region of the spectrum.

In some embodiments, titanium dioxide or doped titanium dioxide particulate material is coated and has ultra-low photocatalytic activity. Thus, products containing this material may have improved photostability relative to similar products containing conventional titanium dioxide.

BACKGROUND TO THE INVENTION

The NIR region of the electromagnetic spectrum lies between 700 and 2500 nm. Materials having high reflectance and reduced absorption in this range may be advantageous in many applications. For instance, products made from such materials tend to remain cooler under solar illumination and lower temperatures can result in lower thermal degradation, improved durability, greater comfort, lower air conditioning costs, and reduced environmental impact.

A current environmental focus (and cost factor) is to reduce the amount of air conditioning needed to cool buildings. One way to reduce air conditioning costs is to use roofing products that reflect solar energy. The US Environmental Protection Agency (EPA) Energy Star Initiative requires steep-slope (pitched) residential roofing to have a minimum Total Solar Reflectance (TSR) of 25%. Lighter coloured products may be able to meet this minimum, but by their nature, dark or intensely coloured products may not be able to so and tend to have a TSR well below 25% such as 10% or less. This can create a problem for those who find dark or intense colours aesthetically pleasing, but want the advantages of a higher TSR.

High solar reflectance may be achieved in different ways. For instance, items with white outer surfaces may have high solar reflectance, but if a colour is desired this approach is unsatisfactory. Alternatively, high solar reflectance may be achieved by combining conventional $TiO_2$ pigments with non-NIR absorbing coloured pigments and dyes. This approach is also limited because the levels of conventional $TiO_2$ pigment required to give the desired levels of solar reflection will necessarily result in relatively pale colours. Therefore, darker or more intense colours are not possible in such a reflective formulation. In yet another alternative, a white layer having a high solar reflectance may be applied to an item, which is followed by a layer containing NIR-transparent coloured pigments. The pigmented overcoat does not reflect or absorb NIR radiation. This system too is not ideal because it takes time to apply the two different coats, they can, if not properly applied, result a "patchy" appearance with the white undercoat showing through portions of the coloured overcoat, and the colour may lighten over time as the overcoat weathers away exposing more undercoat.

Thus, there is a need for a high total solar reflective material that is available in a wide range of darker or more intense colours than would be otherwise achievable for a given solar reflectance. Such colours include mid-tones and even darker/more intense pastels. Furthermore, there is a need for a one-coat system to apply such solar-reflective coloured materials, which can be used in a range of applications including roofing surfaces, plastic items, road surfaces and paints. In this way, consumers could then have items they want with both the desired coloured appearance and good total solar reflection. Those items could then contribute to a cooler living environment and/or reduced air conditioning energy usage, thermal degradation, environmental footprint, and/or contribution to global warming.

Additionally, items exposed to the sun may not be photostable and can prematurely deteriorate. Such items including paints, plastics products, roofing products, and ground covering products, may contain titanium dioxide. Although titanium dioxide itself does not degrade, the extent to which an item containing titanium dioxide degrades may depend upon the photocatalytic activity of the titanium dioxide pigment used in the item.

For example, and without being bound by theory, if a titanium dioxide crystal absorbs UV light, it is thought that an electron is promoted to a higher energy level (the conductance band) and moves through the lattice. The resulting vacancy or "hole" in the valence band also effectively 'moves'. If these mobile charges reach the crystal surface, they can be transferred to the medium of the titanium dioxide containing article (e.g. the resinous medium of paint), and produce free radicals which degrade the medium.

Thus, there is a need for titanium dioxide particles having ultra-low photocatalytic activity. Such titanium dioxide particles may then be used to improve the lifetime of items exposed to the sun. For example, such titanium dioxide particles may be used in combination with highly photostable resins, paint binders, and the like, to lengthen the overall lifetime of a sun-exposed item.

SUMMARY OF THE INVENTION

In the first part of the invention, the present invention provides, in a first aspect, a coloured composition comprising:
 NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
 one or more non-white colorant;
wherein the particulate material and the non-white colorant are dispersed within a vehicle.

The particulate material with a large crystal size has unusually high reflection of NIR radiation and, simultaneously, noticeably diminished reflectance of visible light compared to conventional pigments. This surprising effect means that a lower content of such NIR scattering material can still achieve a good NIR reflection level. An additional advantage is that a lower level of non-white colorant is required to achieve any given darker or more intense colour.

Surprisingly, the particulate material which is a large crystal titanium dioxide or doped titanium dioxide blends in a composition with a darker, or more intensely coloured, colorant without unduly affecting the colour of the composition.

In contrast, conventional $TiO_2$ pigment is very reflective of visible light and does clearly affect the colour of a composition, making it noticeably paler. Thus the particulate material used in the present invention, which is a large crystal titanium dioxide or doped titanium dioxide, blends in a composition with a darker, or more intensely coloured, colorant without affecting the colour as much as conventional $TiO_2$ pigment.

In the first part of the invention, the present invention also provides, in a second aspect, the use of a composition in accordance with the first aspect to provide a single coat covering that has solar reflectivity and a non-white colour, or to produce an article that has solar reflectivity and a non-white colour.

In the first part of the invention, the present invention also provides, in a third aspect, the use of an NIR scattering particulate material which is selected from titanium dioxide, doped titanium dioxide and combinations thereof, has an average crystal size of greater than 0.40 µm and has a particle size distribution such that 30% or more of the particles are less than 1 µm, to increase the solar reflection level, preferably while also diminishing the visible reflection level, of a coloured composition.

In the first part of the invention, the present invention also provides, in a fourth aspect, an article comprising a composition in accordance with the first aspect.

In the second part of the invention, the present invention provides, in a first aspect, a coated particulate material, wherein:
 (i) the material is selected from titanium dioxide, doped titanium dioxide and combinations thereof;
 (ii) the material has an average crystal size of greater than 0.40 µm; and
 (iii) the coating comprises one or more oxide material, wherein the material is an oxide of one or more elements which are:
  (a) group 4 (IVB) and 12 (IIB) transition metals selected from Ti, Zr and Zn and/or
  (b) group 13 to 15 (IIIA-VA) p-block elements selected from Si, Al, P and Sn and/or
  (c) lanthanides.

Surprisingly, it has been found that by combining large crystal titanium dioxide or large crystal doped titanium dioxide with conventional milling and coating technologies, improved titanium dioxide particle containing products can be obtained, with low levels of photocatalytic activity that were previously unattainable.

The coated particulate material is substantially white. Preferably, the product has a lightness value L* (CIE L*a*b* colour space) of greater than 95, with a value of a* of less than 5 and a value of b* of less than 5.

In the second part of the invention, the present invention also provides, in a second aspect, the use of
 (i) an average crystal size of greater than 0.40 µm; and
 (ii) a coating comprising one or more oxide material, wherein the material is an oxide of one or more elements which are:
  (a) group 4 (IVB) and 12 (IIB) transition metals selected from Ti, Zr and Zn and/or
  (b) group 13 to 15 (IIIA-VA) p-block elements selected from Si, Al, P and Sn and/or
  (c) lanthanides
to lower the photocatalytic activity of a material selected from titanium dioxide, doped titanium dioxide and combinations thereof.

In the second part of the invention, the present invention also provides, in a third aspect, the use of a material in accordance with the first aspect of the second part to improve the durability and/or lifetime of a product that is exposed to the sun during use.

In the second part of the invention, the present invention also provides, in a fourth aspect, a product that is exposed to the sun during use, the product comprising material in accordance with the first aspect of the second part.

DETAILED DESCRIPTION OF THE INVENTION

A. First Part—Solar Reflective Coloured Products

Figure 1:
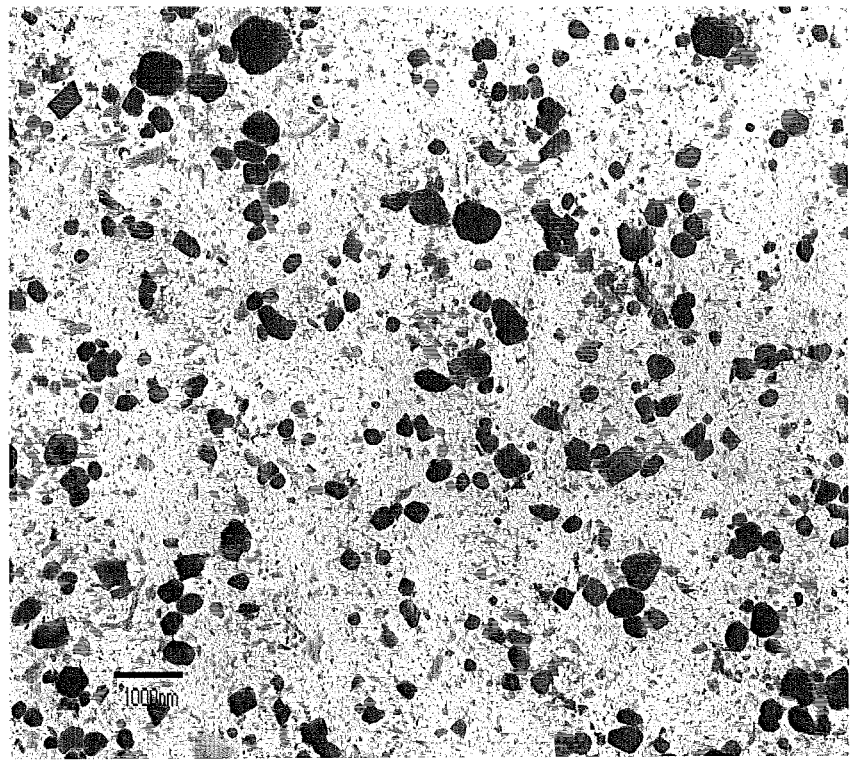
FIG. 1: Electron micrograph of large crystal large crystal $TiO_2$ made according to Example 1B

The present invention provides, in a first aspect, a coloured composition comprising:
 NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
 one or more non-white colorant;
wherein the particulate material and the non-white colorant are dispersed within a vehicle.

Preferably the non-white colorant has low absorption in the NIR part of the spectrum. In one embodiment, the non-white colorant may have an average absorption coefficient of 50 $mm^{-1}$ or less in the NIR region between 700 and 2500 nm. Preferably, the non-white colorant may have an average absorption coefficient of 20 $mm^{-1}$ or less in the spectrum between 700 and 2500 nm, such as 15 $mm^{-1}$ or less, e.g. 12 $mm^{-1}$ or less, for example 10 $mm^{-1}$ or less.

This composition has the colorant and particulate material mixed together in one composition while achieving the desired solar energy reflecting effect.

The particulate material with a large crystal size has unusually high reflection of NIR radiation and, simultaneously, noticeably diminished reflectance of visible light compared to conventional pigments. This surprising effect means that a lower content of such NIR scattering material can still achieve a good NIR reflection level. An additional advantage is that a lower level of non-white colorant is required to achieve any given colour.

Surprisingly, the particulate material which is a large crystal titanium dioxide or doped titanium dioxide blends in a composition with a darker or more intensely coloured colorant without unduly affecting the colour of the colorant. In contrast, conventional TiO$_2$ pigment is very reflective of visible light and does clearly affect the colour of a composition, making it noticeably paler. Thus the particulate material used in the present invention, which is a large crystal titanium dioxide or doped titanium dioxide, blends in a composition with a darker, or more intensely coloured, colorant without affecting the colour as much as conventional TiO$_2$ pigment.

The present composition allows NIR reflective coatings to be applied in a single application. Such a one coat solar reflective coating offers advantages in speed of application and consequent cost of application and also in the uniformity of the colour across a surface.

JP2005330466A describes the use of 0.5 to 1.5 micron diameter IR reflective particles, which may be TiO$_2$, coated with a resin film transparent to IR radiation. The film coating may contain a substantially non-IR-absorbing pigment. However, although these products have large particle diameters, they are not described as being made from large crystal size titanium dioxide as in the products of the present invention. As discussed below in more detail, the particle size and crystal size of a TiO$_2$ particle are not the same. The fact that the prior art products do not use large crystal size TiO$_2$ gives rise to a number of technical differences between those products and the products of the invention.

In particular, a large (e.g. 1 micron diameter) particle formed from conventional (pigmentary) titanium dioxide crystals will not be robust to processing. In contrast, the present invention makes use of large crystal sizes which provides for a robust and durable product. Additionally, in the present invention less material is required to attain equivalent IR reflection as compared to a product using conventional (pigmentary) titanium dioxide crystals. Further, the products of JP2005330466A do not exhibit the surprising advantage of the present invention, whereby IR reflectance is increased whilst visible reflectance is reduced, which leads to a lower level of non-white colorant being required to achieve any given colour in the present invention as compared to the prior art. Further, from the density indicated in this document, it can be seen that these products are uncoated and therefore prone to harmful photocatalysis which is a major impediment in any composition or product designed for exposure to solar radiation.

US2007065641 describes roofing granules containing coarse TiO$_2$ and colored IR reflector particles. The particle size distribution is broad: 100% less than 40 microns, 50 to 100% less than 10 microns and 0 to 15% less than micron. This compares to the specific defined particle size distribution required by the invention, such that 30% or more of the particles have a particle size less than 1 micron. The particles described in US2007065641 would be crude and gritty, and prone to clumping, and consequently unsuited to many end uses, such as decorative applications.

US2008/0008832 relates to roofing granules formed using a coloured core which may be coated with TiO$_2$. WO2005/095528 relates to a wall paint containing TiO$_2$ and a heat reflective colored pigment component. In both these documents the TiO$_2$ is pigmentary rather than having the large crystal size required by the present invention.

The prior art does not recognise or suggest the benefits in formulating coloured compositions with superior weatherability and solar reflectance that have, surprisingly, been achieved by using NIR scattering particulate material possessing both a large crystal size and a defined particle size distribution, with a colorant to obtain a coloured composition.

The composition may include only a single type of NIR scattering particulate material or may include two or more different types of NIR scattering particulate material.

The NIR scattering particulate material used in the present invention is titanium dioxide or a doped titanium dioxide (or a combination thereof), and has an average crystal size of greater than 0.40 μm and a particle size distribution such that 30% or more of the particles are less than 1 μm. Such material scatters surprisingly efficiently in the NIR region of the spectrum (700-2500 nm). However, it absorbs strongly in the UV region (300-400 nm). It has relatively low scattering and low absorbance in the visible region of the spectrum (400-700 nm).

Surprisingly, the high refractive index of the NIR scattering particulate material outweighs the disadvantage of having strong solar ultraviolet absorption, giving superior total solar reflectance. The strong solar ultraviolet absorption of these particles also gives the advantageous property of high solar ultraviolet opacity, a property which can enhance the weatherability of any article exposed to sunlight.

In one embodiment, the particulate material is or comprises a doped titanium dioxide, that is to say an inorganic material containing TiO$_2$. The doped titanium dioxide may have a TiO$_2$ content of 10 wt % or more, preferably 12 wt % or more.

The doped titanium dioxide may be in either the rutile or anatase crystal form. Preferably the doped titanium dioxide possesses the rutile crystal structure. As the skilled man will appreciate, this is not necessarily rutile but can be material which is iso-structural with rutile.

In the present invention the rutile crystal form may be preferable because of its higher refractive index. This means that less is needed to achieve a given NIR reflectivity and, when optimised, the effect is stronger. For example, it may be 50% or more by weight rutile, such as 60% or more, e.g. 70% or more, preferably 80% or more, more preferably 90% or more, most preferably 95% or more, such as 99% or more, for example 99.5% or more.

The doped titanium dioxide may, for example, be doped with dopants such as calcium, magnesium, sodium, aluminium, antimony, phosphorus, and caesium.

The doped titanium dioxide may include impurities, e.g. up to a level of 10 wt % or less, such as 8 wt % or less, e.g. 5 wt % or less. These impurities result from incomplete purification and may, for example, be iron, silica, niobia or other impurities typically present in titanium dioxide bearing feedstocks.

In one embodiment, the particulate material is or comprises titanium dioxide. Titanium dioxide can be prepared by any known method. For example, the so-called "sulphate" route or the so-called "chloride" route may be used, which are the two routes in wide commercial use. Equally, the fluoride process, hydrothermal processes, aerosol processes or leaching processes may be used to prepare the titanium dioxide.

The titanium dioxide may be in either the rutile or anatase crystal form. In the present invention the rutile crystal form may be preferable because of its higher refractive index. This means that less is needed to achieve a given NIR reflectance effect and, when optimised, the effect is stronger.

In one embodiment, the titanium dioxide is 50% or more by weight rutile, such as 60% or more, e.g. 70% or more, preferably 80% or more, more preferably 90% or more, most preferably 95% or more, such as 99% or more, for example 99.5% or more.

The titanium dioxide may be white or translucent or may be coloured. In one embodiment, it may be substantially white; for example it may have a lightness value L* (CIE L*a*b* colour space) of greater than 95, with a value of a* of less than 5 and a value of b* of less than 5.

The titanium dioxide may include impurities, e.g. up to a level of 10 wt % or less, such as 8 wt % or less, e.g. 5 wt % or less. These impurities result from incomplete purification and may, for example, be iron, silica, niobia or other impurities typically present in titanium dioxide bearing feedstocks. Preferably the titanium dioxide has a $TiO_2$ content of 90 wt % or higher, such as 92 wt % or higher, for example 93 wt % or higher.

In the present invention, the NIR scattering particulate material has an average crystal size of greater than or equal to 0.40 μm. Preferably, the NIR scattering particulate material has an average crystal size of greater than or equal to 0.45 μm. Preferably the average crystal size is greater than or equal to 0.50 μm, e.g. 0.55 μm or greater, more preferably 0.60 μm or greater, such as 0.70 μm or greater, e.g. 0.80 μm or greater.

In one embodiment, the NIR scattering particulate material has an average crystal size of greater than 0.40 μm and up to 1.20 μm, e.g. from 0.45 to 1.1 μm, more preferably from 0.50 to 1.1 μm, such as from 0.60 to 1.0 μm, e.g. from 0.70 to 1.00 μm.

Average crystal size may be determined by transmission electron microscopy on a rubbed out sample with image analysis of the resulting photograph (e.g. using a Quantimet 570 Image Analyser). This may be validated by reference to the latex NANOSPHERE™ size standard 3200 from NIST with a certified size of 199+/−6 nm.

Conventional rutile $TiO_2$ has an average crystal size of from 0.17 to 0.29 μm, whilst conventional anatase $TiO_2$ has an average crystal size of from 0.10 to 0.25 μm.

Crystal size is distinct from particle size. The particle size depends on the effectiveness of the dispersion of the pigment in the system within which it is used. Particle size is determined by factors such as crystal size and milling techniques, e.g. dry, wet or incorporative milling. The particle size of conventional rutile $TiO_2$ is from 0.25 to 0.40 μm, whilst conventional anatase $TiO_2$ has a particle size of from 0.20 to 0.40 μm. Larger particle sizes can result if the techniques used are such that crystals "clump" together.

In the present claimed invention, the NIR scattering particulate material has an average particle size, as determined by X-ray sedimentation, of greater than 0.40 μm. For example, the average particle size may be greater than 0.40 μm and up to 1.2 μm. Preferably the average size is greater than or equal to 0.45 μm, such as from 0.45 to 1.1 μm, e.g. from 0.50 to 1.0 μm, more preferably from 0.60 to 1.0 μm.

In the present claimed invention, the NIR scattering particulate material has a particle size distribution such that 30% or more of the particles are less than 1 μm. In one embodiment, the NIR scattering particulate material has a particle size distribution such that 35% or more of the particles are less than 1 μm, such as a particle size distribution such that 40% or more of the particles are less than 1 μm. In the present application, where reference is made to a percentage of the particles having a given size, this is intended to be a percentage by weight.

To measure particle size, the product is subjected to high shear mixing, in the presence of a suitable dispersant, to disperse the particles without comminution. The particle size distribution is measured using a Brookhaven XDC X-Ray disk centrifuge. Mean particle size, and particle size geometric weight standard deviation, are recorded.

The NIR scattering particulate material may be treated or coated, as known in the art.

As the skilled man will appreciate, the NIR scattering particulate material, which is titanium dioxide, doped titanium dioxide or combinations thereof, is prepared via a process that involves a milling step. The particles resulting from the milling step may be coated e.g. with a hydrated oxide such as silica, alumina, or zirconia; this coating step may result in reduced photocatalytic activity, improved dispersibility, reduced yellowing or better opacity.

The particles may, for example, be coated at a level of up to 20% wt/wt with inorganic or organic coatings, e.g. from 0.5 to 20% wt/wt.

In one embodiment inorganic coating material selected from inorganic oxides, hydroxides, and combinations thereof may be used. Examples of these materials, expressed as their oxides, are $Al_2O_3$, $SiO_2$, $ZrO_2$, $CeO_2$, and $P_2O_5$.

An organic surface treatment, such as with polyol, amine (e.g. an alkanolamine) or silicone derivatives, may also be present. This may, in particular, improve dispersibility. Typical organic compounds used are trimethylolpropane, pentaerythritol, triethanolamine, alkyl phosphonic acid (e.g. n-octyl phosphonic acid) and trimethylolethane.

The coating process of the NIR scattering particulate material, which is titanium dioxide, doped titanium dioxide, or combinations thereof, is similar to that of conventional pigmentary material, as known in the art, and involves dispersion of the material in water, following which suitable coating reagents, such as aluminium sulfate, are added. The pH is then adjusted to cause precipitation of the desired hydrated oxide to form a coating onto the surface of the material.

After coating formation, the material may be washed and dried before being ground, e.g. in a fluid energy mill or microniser, to separate particles that have been stuck together by the coating.

At this final milling stage, organic surface treatments, e.g. with polyol, amine, alkyl phosphonic acid or silicone derivatives, may be applied as required.

In one embodiment, the NIR scattering particulate material may be treated to selectively remove particular size fractions before it is used in the composition. For example, any particles which are 5 μm in diameter or greater may be removed; in one embodiment any particles which are 3 μm in diameter or greater may be removed. Such particles may be removed by, for example, a centrifugation treatment.

In the first aspect, the coloured composition may comprise NIR scattering particulate material in an amount of from 0.5 to 70 vol %, such as from 1 to 60 vol %, e.g. from 2 to 50 vol %.

The level of NIR scattering particulate material in the application may be selected appropriately depending on the intended application.

In one embodiment, the composition is intended for use as a paint, and the composition may comprise NIR scattering particulate material in an amount of from 5 to 50% v/v, such as from 10 to 30% v/v, e.g. from 15 to 20% v/v. As the skilled man would appreciate, to maintain the same colour, as more NIR scattering particulate material is added more non-white colorant may be needed.

In one embodiment, the composition is intended for use as a plastics resin composition, and the composition may comprise NIR scattering particulate material in an amount of from 0.5 to 70% v/v; for example in masterbatches levels as high as from 50 to 70% v/v may be possible or desirable.

In one embodiment, the composition is intended for use as a coating composition for a roofing or ground covering product (such as a road surface, pavement or floor), e.g. a surface coating composition for asphalt or tar, and the composition may comprise NIR scattering particulate material in an amount of from 1 to 50% v/v.

The composition may include only a single type of non-white colorant or may include two or more different types of non-white colorant.

The non-white colorant may be selected from any known colorants, such as pigments and dyes. The colorants may include blue, black, brown, cyan, green, violet, magenta, red, orange, or yellow colorants.

The pigments that may be used as the colorant include, but are not limited to, pearlescent pigments, ultramarine pigments, fluorescent pigments, inorganic pigments, carbon pigments, phosphorescent pigments, and organic pigments. Mixtures of such different types of pigments can also be used.

The non-white colorant may in one embodiment be selected from carbon pigments, organic coloured pigments and inorganic coloured pigments.

Examples of carbon products include graphite, carbon black, vitreous carbon, activated charcoal, carbon fibre, or activated carbon blacks. Representative examples of carbon black include channel blacks, furnace blacks and lamp blacks.

Organic coloured pigments include, for example, anthraquinones, phthalocyanine blues, phthalocyanine greens, diazos, monoazos, pyranthrones, perylenes, heterocyclic yellows, quinacridones, quinolonoquinolones, and (thio) indigoids.

Inorganic pigments that may be used include cobalt pigments, copper pigments, chromium pigments, nickel pigments, iron pigments, and lead pigments.

Examples of pigments are cobalt chromite, cobalt aluminate, copper phthalocyanine, haematite, chrome titanate yellow, nickel titanate yellow, synthetic red iron oxide, perylene black, and quinacridone red.

Preferably the non-white colorant or colorants will be selected from non-white colorants with low absorbance within the NIR region of the spectrum. Examples of such colorants are chrome titanate yellow, nickel titanate yellow, synthetic red iron oxide, perylene black, copper phthalocyanine and quinacridone red.

The composition may comprise non-white colorant in an amount from 0.1 to 20 vol %, such as from 0.5 to 15 vol %, e.g. from 1 to 10 vol %, for example about 1 vol %.

In one embodiment the colorant is separate from the NIR scattering material rather than being provided with the NIR scattering material in a single particle. There is a practical advantage in having the NIR scattering material and colorant separate in that this allows formulation freedom to those preparing applications: enabling wider usage. However, in an alternative embodiment the colorant is provided with the NIR scattering material in a single particle, e.g. the colorant is provided in a coating on the NIR scattering material or the NIR scattering material is provided as a coating on a colorant containing core.

The vehicle may be any product or combination of products within which the NIR scattering particulate material and the non-white colorant can be dispersed. For example, it may be a carrier or solvent or a binder.

In one embodiment, the vehicle is or comprises a synthetic or natural resin. Suitable plastics resins include general-purpose resins such as polyolefin resins, polyvinyl chloride resins, ABS resins, polystyrene resins and methacrylic resins; and engineering plastics resins such as polycarbonate resins, polyethylene terephthalate resins and polyamide resins. It may be or comprise a resin binder for paint, such as an acrylic resin, polyurethane resin, polyester resin, melamine resin, epoxy resin, or oil. It may be or comprise an asphalt/tar binder for roads or roofs. In one example, the vehicle is or comprises a polyester resin such as alkyd resin. In one embodiment, the vehicle is or comprises an aqueous carrier or solvent, such as water. In one embodiment, the vehicle is or comprises a non aqueous carrier or solvent, such as an organic carrier or solvent. The carrier or solvent may, for example, be an aliphatic solvent, aromatic solvent, alcohol, or ketone. These include organic carriers or solvents such as petroleum distillate, alcohols, ketones, esters, glycol ethers, and the like.

In one embodiment, the vehicle is or comprises a binder, which may for example be a metal silicate binder, e.g. an aluminosilicate binder, or a polymeric binder, e.g. an organic polymeric binder, such as an acrylic polymer binder or an acrylic copolymer binder.

The coloured composition may be a coating composition, which can be used to coat surfaces, or may be a composition from which articles can be formed, e.g. through moulding or other processes.

In one embodiment, the coloured composition is a plastics resin composition. In another embodiment, the coloured composition is paint. In another embodiment, the coloured composition is an ink. In one embodiment, the coloured composition is a powder coating.

In one embodiment, the coloured composition is a component of or a treatment for a textile product. The coloured composition may also be a leather treatment composition.

In one embodiment, the coloured composition is a coating composition for a roofing product or a ground covering product (such as a road surface product, flooring product, driveway surface product, car park surface product or pavement surface product). For example, it may be a composition for coating the surface of an asphalt or tar product.

The composition can optionally include other additives. These may include, but are not limited to, thickeners, stabilizers, emulsifiers, texturizers, adhesion promoters, U-V stabilizers, de-glossing agents, dispersants, antifoaming agents, wetting agents, coalescing solvents and biocides, including fungicides.

In one embodiment, the composition comprises spacer particles. These are components used to space out or support the particles included in the composition. These particles may optionally contribute some pigmentary effect to the composition. Spacer particles are used to reduce the loss of scattering efficiency of the NIR scattering particulate material due to the "crowding effect".

The size of any spacer particles used can vary over quite wide limits. Generally, the size will depend upon the nature of the particles. The average size of the spacer particles is in one embodiment from 0.02 to 40 µm.

The spacer particles may, for example, be silica, silicates, aluminates, sulphates, carbonates or clays, or polymeric particles, e.g. in the form of hollow polymer beads or in the form of microspheres, for example beads or microspheres comprising polystyrene, polyvinyl chloride, polyethylene or acrylic polymers. Preferably, the spacer particles are heteroflocculated, as described in EP 0 573 150.

These spacer particles may enhance both the aesthetics of the composition and the Total Solar Reflectance.

Surprisingly, not only does the composition of this invention have improved NIR reflectance but it also has reduced tinting strength.

The preparation of the NIR scattering particulate material with an average crystal size of greater than 0.40 µm, and a particle size distribution such that 30% or more of the particles are less than 1 µm, may be by standard processes for obtaining such materials, which have been modified such that one or more of the following apply:

a) the calcining is at a higher temperature than standard, e.g. of 900° C. or higher, such as 1000° C. or higher;

b) the calcining is for a longer time than standard, e.g. of 5 hours or more;

c) reduced levels of growth moderators are present during the process; for example it may be that growth moderators are not present during the process;
d) growth promoters are added during the process; in particular increased levels of growth promoters are added during the process;
e) the level of rutile seeds in the calciner feed pulp is reduced.

The large crystal material may be treated in the same way as conventional pigments, e.g. with various additions to make it compatible in a paint, plastic, asphalt or other vehicle.

A process for obtaining NIR scattering titanium dioxide particulate material with an average crystal size of greater than 0.40 μm, and a particle size distribution such that 30% or more of the particles are less than 1 μm, may comprise:

reacting a titaniferous feedstock with sulfuric acid, to form a solid, water soluble reaction cake;

dissolving the cake in water and/or weak acid to produce a solution of a titanium sulfate;

hydrolysing the solution in order to convert the titanium sulfate to titanium dioxide hydrate;

separating the precipitated titanium dioxide hydrate from the solution and calcining to obtain titanium dioxide;

wherein one or more of the following apply:
a) the calcining is at a higher temperature than standard, e.g. of 900° C. or higher, such as 1000° C. or higher;
b) the calcining is for a longer time than standard, e.g. of 5 hours or more;
c) reduced levels of growth moderators are present during the process; for example it may be that growth moderators are not present during the process;
d) growth promoters are added during the process; in particular increased levels of growth promoters are added during the process;
e) the level of rutile seeds in the calciner feed pulp is reduced.

Rutilisation promoters which can optionally be present during calcination include lithium and zinc compounds. Rutilisation inhibitors, whose presence should be controlled, include aluminium, potassium and phosphorus compounds.

The titanium dioxide particulate material may be coated by dispersion of the material in water, following which suitable coating reagents, such as aluminium sulfate, are added. The pH is then adjusted to cause precipitation of the desired hydrated oxide to form a coating onto the surface of the material.

After coating formation, the material may be washed and dried before being ground, e.g. in a fluid energy mill or microniser, to separate particles that have been stuck together by the coating. At this final milling stage, organic surface treatments, e.g. with polyol, amine or silicone derivatives, may be applied as required.

In one embodiment, titanium dioxide particulate material may be treated to selectively remove particular size fractions before it is used in the composition.

The present invention provides, in a second aspect, the use of a composition in accordance with the first aspect to provide a single coat covering that has solar reflectivity and a non-white colour, or to produce an article that has solar reflectivity and a non-white colour.

In one embodiment, the covering has a lightness value L* (CIE L*a*b* colour space) of 75 or less, such as 65 or less, e.g. 55 or less, preferably 45 or less, such as 35 or less, e.g. 25 or less.

Preferably the solar reflectivity achieved is a Total Solar Reflectance (TSR) of 20% or higher, e.g. 25% or higher.

Preferably the composition is used to provide a single coat covering that has solar reflectivity and a dark or intense colour.

The present invention provides, in a third aspect, the use of an NIR scattering particulate material which is selected from titanium dioxide, doped titanium dioxide and combinations thereof, has an average crystal size of greater than 0.40 μm and has a particle size distribution such that 30% or more of the particles are less than 1 μm, to increase the solar reflection level, preferably while also diminishing the visible reflection level, of a coloured composition, e.g. a dark or intensely coloured composition.

In one embodiment, the coloured composition has a lightness value L* (CIE L*a*b* colour space) of 75 or less, such as 65 or less, e.g. 55 or less, preferably 45 or less, such as 35 or less, e.g. 25 or less.

In one embodiment, the NIR scattering particulate material is used to obtain a Total Solar Reflectance (TSR) of 20% or higher for the dark or intensely coloured composition, such as 25% or higher.

The preferred features of the NIR scattering particulate material are as described above in relation to the first aspect.

The invention provides, in a fourth aspect, an article comprising a composition in accordance with the first aspect.

In one embodiment, the article is a roofing surface, for example it may be a shingle, tile, or granular coating. In one embodiment, the article is a container, such as a tank, pipe, or siding, for example a water tank or a water pipe. In one embodiment, the article is a ground covering product, such as a concrete surface, road surface, flooring product, driveway surface, car park surface or pavement surface. In one embodiment, the article is a painted article. In one embodiment, the article is a powder coated article. In one embodiment, the article is a vehicle, e.g. a car, caravan, truck or van. In one embodiment, the article is a building, e.g. a house, hotel, office or factory. In one embodiment, the article is a plastic article. In one embodiment, the article is a textile or leather product.

B. Second Part—Photostable Products

The present invention provides, in an embodiment of a first aspect, a coated particulate material, wherein:
(i) the material is selected from titanium dioxide, doped titanium dioxide and combinations thereof;
(ii) the material has an average crystal size of greater than 0.40 μm; and
(iii) the coating comprises one or more oxide material, wherein the material is an oxide of one or more elements such as Al, Si, Zr, Ce, and P, although embodiments are not so limited. For example, in some embodiments the oxide material of the coating may also be an oxide of one or more of Ti, Zn, and Sn.

Thus, in one embodiment, the coating comprises one or more oxide materials, wherein the material is an oxide of one or more elements which are:
(a) group 4 (IVB) and 12 (IIB) transition metals selected from Ti, Zr and Zn and/or
(b) group 13 to 15 (IIIA-VA) p-block elements selected from Si, Al, P and Sn and/or
(c) lanthanides.

With such products, durability is attainable which is beyond the range achievable using conventional pigmentary crystal size material. This has advantages in terms of convenience, expense, appearance and sustainability.

In many exterior paints, carbon black acts as a colorant but also serves the purpose of absorbing harmful ultraviolet radiation and therefore enhancing weatherability. In replacing carbon black with an alternative black, the resulting photo-protection deficiency must also be addressed. The present invention is particularly useful, by virtue of its UV absorption and low photocatalytic activity, in addressing this deficiency.

The coated particulate material is substantially white. Preferably, the product has a lightness value L* (CIE L*a*b* colour space) of greater than 95, with a value of a* of less than 5 and a value of b* of less than 5. In one embodiment, the product has a lightness value L* of greater than 96, such as greater than 97, greater than 98, or greater than 99. a* may in one embodiment be less than 4, such as less than 3. b* may in one embodiment be less than 4, such as less than 3.

The coating is therefore selected so as to achieve a product that looks substantially white to the eye. Preferably, any coloured oxide materials included in the coating, such as ceric oxide, are present in amounts of 0.5 wt % or less, preferably 0.4 wt % or less, more preferably 0.3 wt % or less, in particular 0.2 wt % or less.

In one embodiment, the coated particulate material is provided in a coloured composition comprising:
  the coated particulate material as NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
  one or more non-white colorant;
wherein the particulate material and the non-white colorant are dispersed within a vehicle.

In particular, in this embodiment the NIR scattering particulate material, which is titanium dioxide, doped titanium dioxide or combinations thereof, is prepared via a process that involves a milling step. The particles resulting from the milling step are coated e.g. with hydrated oxide such as silica, alumina, or zirconia; this coating step may result in reduced photocatalytic activity, improved dispersibility, reduced yellowing or better opacity.

The particles may, for example, be coated at a level of up to 20% wt/wt with inorganic coatings, e.g. from 0.5 to 20% wt/wt.

In one embodiment inorganic coating material selected from inorganic oxides may be used. Examples of these materials, expressed as their oxides, are $Al_2O_3$, $SiO_2$, $ZrO_2$, $CeO_2$, and $P_2O_5$.

Preferably the non-white colorant has low absorption in the NIR part of the spectrum. In one embodiment, the non-white colorant may have an average absorption coefficient of 50 $mm^{-1}$ or less in the NIR region between 700 and 2500 nm. Preferably, the non-white colorant may have an average absorption coefficient of 20 $mm^{-1}$ or less in the spectrum between 700 and 2500 nm, such as 15 $mm^{-1}$ or less, e.g. 12 $mm^{-1}$ or less, for example 10 $mm^{-1}$ or less.

Accordingly, in one embodiment the invention provides a coloured composition comprising:
  NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
  one or more non-white colorant;
wherein the particulate material and the non-white colorant are dispersed within a vehicle;
and wherein the coating comprises one or more oxide material, wherein the material is an oxide of one or more elements which are:
  (a) group 4 (IVB) and 12 (IIB) transition metals selected from Ti and Zr and Zn and/or
  (b) group 13 to 15 (IIIA-VA) p-block elements selected from Si, Al, P and Sn and/or
  (c) lanthanides.

In particular, the coating material may be selected from $Al_2O_3$, $SiO_2$, $ZrO_2$, $CeO_2$, and $P_2O_5$.

In an alternative embodiment, the coated particulate material is not provided in a coloured composition comprising:
  NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
  one or more non-white colorant;
wherein the particulate material and the non-white colorant are dispersed within a vehicle.

In such an embodiment, the coated particulate material may be provided on its own, or in any composition that is a combination of the coated particulate material with one or more other component, provided that the composition is not a coloured composition comprising:
  NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and
  one or more non-white colorant;
wherein the particulate material and the non-white colorant are dispersed within a vehicle.

The present invention also provides, in a second aspect, the use of
  (i) an average crystal size of greater than 0.40 µm; and
  (ii) a coating comprising one or more oxide material, wherein the material is an oxide of one or more elements which are:
    (a) group 4 (IVB) and 12 (IIB) transition metals selected from Ti, Zr and Zn and/or
    (b) group 13 to 15 (IIIA-VA) p-block elements selected from Si, Al, P and Sn and/or
    (c) lanthanides
to lower the photocatalytic activity of a material selected from titanium dioxide, doped titanium dioxide and combinations thereof.

The particulate material, when coated, is preferably substantially white. Preferably, the product has a lightness value L* (CIE L*a*b* colour space) of greater than 95, with a value of a* of less than 5 and a value of b* of less than 5. In one embodiment, the product has a lightness value L* of greater than 96, such as greater than 97, greater than 98, or greater than 99. a* may in one embodiment be less than 4, such as less than 3. b* may in one embodiment be less than 4, such as less than 3.

The coating is therefore suitably selected so as to achieve a product that looks substantially white to the eye. Preferably, any coloured oxide materials included in the coating, such as ceric oxide, are present in amounts of 0.5 wt % or less, preferably 0.4 wt % or less, more preferably 0.3 wt % or less, in particular 0.2 wt % or less.

In one embodiment, the use is in relation to a coloured composition comprising:
  the material as NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and one or more non-white colorant;

wherein the particulate material and the non-white colorant are dispersed within a vehicle.

In one embodiment the oxide coating material is selected from $Al_2O_3$, $SiO_2$, $ZrO_2$, $CeO_2$, and $P_2O_5$.

This coloured composition may be as described above.

In an alternative embodiment, the use is not in relation to a coloured composition comprising:

NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and one or more non-white colorant;

wherein the particulate material and the non-white colorant are dispersed within a vehicle.

In such an embodiment, the use may be in relation to the material on its own, or the use may be in relation to the material in any composition that is a combination of the coated particulate material with one or more other component, provided that the composition is not a coloured composition comprising:

NIR scattering particulate material, the material being selected from titanium dioxide, doped titanium dioxide and combinations thereof, the material having an average crystal size of greater than 0.40 µm and a particle size distribution such that 30% or more of the particles are less than 1 µm; and one or more non-white colorant;

wherein the particulate material and the non-white colorant are dispersed within a vehicle.

The invention also provides, in a third aspect, the use of a material in accordance with the first aspect to improve the durability and/or lifetime of a product that is exposed to the sun during use.

The invention also provides, in a fourth aspect, a product that is exposed to the sun during use, the product comprising material in accordance with the first aspect.

U.S. Pat. No. 4,125,412 describes preparing titanium dioxide pigments that possess outstanding chalk resistance, excellent dispersibility and outstanding tint retention when employed in paint formulation, by providing these pigments with a dense silica coating followed by alumina deposition. However, these conventional titanium dioxide pigment products do not achieve the surprisingly good durability permitted by the present claimed invention, which arises from the synergistic combination of large crystal size and coating.

EP 0595471 teaches how to apply dense silica coatings to $TiO_2$ using ultrasound.

JP 06107417 describes coating acicular $TiO_2$ with 1 to 30 wt % of metal salts and then firing, in order to provide a coloured product. $TiO_2$ acicles have a physical resemblance to asbestos, which owes its undesirable properties to its high aspect ratio/acicularity characteristics. In the present invention the particulate material preferably has an aspect ratio of less than 4:1.

The prior art does not teach how to improve the durability and/or lifetime of a product that is exposed to the sun during use.

The products of the invention provide increased lifetimes, as compared to the prior art, for titanium dioxide pigment containing objects exposed to solar radiation. The prior art does not teach or suggest that the combination of large crystal titanium dioxide with the coating gives such a reduction in photocatalytic activity.

The combination of large crystal titanium dioxide with the coating gives a greater reduction in photocatalytic activity than would have been predicted from the known effect of coating. This synergistic effect is unexpected and provides a significant benefit.

As discussed above, in the present invention the coating comprises one or more oxide material, wherein the material is an oxide of one or more elements which are:

(a) group 4 (IVB) and 12 (IIB) transition metals selected from Ti, Zr and Zn and/or (b) group 13 to 15 (IIIA-VA) p-block elements selected from Si, Al, P and Sn and/or (c) lanthanides.

Examples of suitable lanthanides include Ce.

As the skilled man would appreciate, the oxide material may be in the form of a mixed oxide, such as an oxyhydroxide, or in the form of a hydrated oxide, as well as in the form of an oxide containing only the element plus oxygen.

The coating on the particles may be dense or non-dense. For example, the skilled man would appreciate that both silica and alumina may be provided as dense or non dense coatings. A sample of standard rutile titanium dioxide crystals has a surface area of around 7 $m^2$/g. A sample of standard rutile titanium with a 3% w/w non-dense coatings has a surface area of around 17 $m^2$/g. A sample of standard rutile titanium with a 3% w/w dense coating has a surface area of around between 6 $m^2$/g and 10 $m_2$/g.

In one embodiment, two or more coatings comprising oxide material are used. These may be used in combination to give a single layer, or may be used to provide two or more separate layers, each layer having a different composition.

For example, the coating for the particles may comprise a layer of silica, e.g. dense silica, and a layer of alumina.

The particles may be coated with any suitable amounts of coating material. The particles may, for example, be coated at a level of up to 20% wt/wt with inorganic coatings, e.g. from 0.5 to 20% wt/wt. In one embodiment, the particles may be coated at a level of up to 20% wt/wt, e.g. from 0.1 to 20% wt/wt, such as from 0.5 to 10% wt/wt, for example from 0.5 to 7% wt/wt.

An organic surface treatment, such as with polyol, amine (e.g. an alkanolamine) or silicone derivatives, may also be present. This may, in particular, improve dispersibility. Typical organic compounds used are trimethylolpropane, pentaerythritol, triethanolamine, alkyl phosphonic acid (e.g. n-octyl phosphonic acid) and trimethylolethane.

The particulate material used in the present invention is titanium dioxide or a doped titanium dioxide (or a combination thereof), and has an average crystal size of greater than 0.40 µm. There may be only a single type of particulate material or there may be two or more different types of particulate material.

In one embodiment, the particulate material is or comprises a doped titanium dioxide.

The doped titanium dioxide may have a $TiO_2$ content of 10 wt % or more, preferably 12 wt % or more. Preferably, the doped titanium dioxide may have a $TiO_2$ content of 80 wt % or more, preferably 85 wt % or more.

The doped titanium dioxide may be in either the rutile or anatase crystal form or a mixture of anatase and rutile.

In one embodiment, the doped titanium dioxide possesses the rutile crystal structure. In another embodiment, the doped titanium dioxide possesses the anatase crystal structure. Anatase and rutile have different strengths; the present invention allows for a more durable version of either form.

For example, it may be 50% or more by weight rutile, such as 60% or more, e.g. 70% or more, preferably 80% or more, more preferably 90% or more, most preferably 95% or more, such as 99% or more, for example 99.5% or more.

The doped titanium dioxide may, for example, be doped with dopants such as calcium, magnesium, sodium, aluminium, antimony, phosphorus, and caesium. The doped titanium dioxide may, in one embodiment, be doped with dopants selected from Cr, V, Mn and Al.

The doped titanium dioxide may include impurities, e.g. up to a level of 10 wt % or less, such as 8 wt % or less, e.g. 5 wt % or less. These impurities result from incomplete purification and may, for example, be iron, silica, niobia or other impurities typically present in titanium dioxide bearing feedstocks. In one embodiment, the doped titanium dioxide may include impurities up to a level of 0.5 wt % or less, such as 0.1 wt % or less, e.g. 0.01 wt % or less; these impurities may, for example, be Fe, P, Nb or other impurities typically present in titanium dioxide bearing feedstocks.

The doped titanium oxide may have a lattice that is doped with an impurity that acts as a recombination centre for holes and electrons. For example, Cr, Mn, and V can all be used as dopants to promote recombination. These impurities tend to be added in the form of a salt before calcination, by addition of the salt to the precipitated slurry/pulp. Alternatively the impurities can be allowed to come through from the titanium ore, in controlled quantities. The amounts of dopant used are typically from 2 to 10 ppm because the durability benefit has to be balanced against colour deterioration.

In one embodiment, the particulate material is or comprises titanium dioxide.

Titanium dioxide can be prepared by any known method. For example, the so-called "sulphate" route or the so-called "chloride" route may be used, which are the two routes in wide commercial use. Equally, the fluoride process, hydrothermal processes, aerosol processes or leaching processes may be used to prepare the titanium dioxide.

The titanium dioxide may be in either the rutile or anatase crystal form. In one embodiment, the titanium dioxide is 50% or more by weight rutile, such as 60% or more, e.g. 70% or more, preferably 80% or more, more preferably 90% or more, most preferably 95% or more, such as 99% or more, for example 99.5% or more.

The titanium dioxide may be white or may be coloured. In one embodiment, it is substantially white; for example it may have a lightness value L* (CIE L*a*b* colour space) of greater than 95, with a value of a* of less than 5 and a value of b* of less than 5.

The titanium dioxide may include impurities, e.g. up to a level of 10 wt % or less, such as 8 wt % or less, e.g. 5 wt % or less. These impurities result from incomplete purification and may, for example, be iron, silica, niobia or other impurities typically present in titanium dioxide bearing feedstocks. In one embodiment the titanium dioxide may include impurities up to a level of 0.5 wt % or less, such as 0.1 wt % or less, e.g. 0.01 wt % or less; these impurities may, for example, be iron, phosphorous, niobia or other impurities typically present in titanium dioxide bearing feedstocks.

Preferably the titanium dioxide has a $TiO_2$ content of 90 wt % or higher, such as 92 wt % or higher, for example 93 wt % or higher. More preferably the titanium dioxide has a $TiO_2$ content of 95 wt % or higher, such as 99 wt % or higher, for example 99.5 wt % or higher.

The titanium oxide may have a lattice that is doped with an impurity which acts as a recombination centre for holes and electrons. For example, Cr, Mn and V can all be used as dopants to promote recombination. These impurities tend to be added in the form of a salt before calcination, by addition of the salt to the precipitated slurry/pulp. Alternatively the impurities can be allowed to come through from the titanium ore, in controlled quantities. The amounts of dopant used are typically from 2 to 10 ppm because the durability benefit has to be balanced against colour deterioration.

In the present invention the particulate material preferably has an aspect ratio of less than 4:1, such as 3:1 or less, more preferably 2:1 or less.

In the present invention, the particulate material has an average crystal size of greater than or equal to 0.40 μm. Preferably, the particulate material has an average crystal size of greater than or equal to 0.45 μm. Preferably the average crystal size is greater than or equal to 0.50 μm, e.g. 0.55 μm or greater, more preferably 0.60 μm or greater, such as 0.70 μm or greater, e.g. 0.80 μm or greater.

In one embodiment, the NIR scattering particulate material has an average crystal size of greater than 0.40 μm and up to 1.20 μm, e.g. from 0.45 to 1.1 μm, more preferably from 0.50 to 1.1 μm, such as from 0.60 to 1.0 μm, e.g. from 0.70 to 1.00 μm.

In another embodiment, the particulate material has an average crystal size of greater than 0.40 μm and up to 2.0 μm, e.g. from 0.45 to 1.8 μm, more preferably from 0.50 to 1.6 μm, such as from 0.60 to 1.4 μm.

Average crystal size may be determined by transmission electron microscopy on a rubbed out sample with image analysis of the resulting photograph (e.g. using a KS300 Image Analyser). This may be validated by reference to the latex NANOSPHERE™ size standard 3200 from NIST with a certified size of 199+/−6 nm.

Conventional rutile titanium dioxide pigment has an average crystal size from 0.17 to 0.29 μm, whilst conventional anatase titanium dioxide pigment has an average crystal size of from 0.10 to 0.25 μm.

Crystal size is distinct from particle size. The particle size depends on the effectiveness of the dispersion of the pigment in the system within which it is used. Particle size is determined by factors such as crystal size and milling techniques, e.g. dry, wet or incorporative milling. The average particle size of conventional rutile titanium dioxide pigment is from 0.25 to 0.40 μm, whilst conventional anatase titanium dioxide pigment has an average particle size of from 0.20 to 0.40 μm. Larger particle sizes can result if the techniques used are such that crystals "clump" together.

In the present claimed invention, the particulate material preferably has an average particle size, as determined by X-ray sedimentation, of greater than 0.40 μm. For example, the average particle size may be greater than 0.40 μm and up to 1.2 μm. Preferably the average size is greater than or equal to 0.45 μm, such as from 0.45 to 1.1 μm, e.g. from 0.50 to 1.0 μm, more preferably from 0.60 to 1.0 μm.

In the present claimed invention, the particulate material preferably has a particle size distribution such that 30% or more of the particles are less than 1 μm. In one embodiment, the particulate material has a particle size distribution such that 35% or more of the particles are less than 1 such as a particle size distribution such that 40% or more of the particles are less than 1 μm. In the present application, where reference is made to a percentage of the particles having a given size, this is intended to be a percentage by weight.

To measure particle size, the product is subjected to high shear mixing, in the presence of a suitable dispersant, to disperse the particles without comminution. The particle size distribution is measured using a Brookhaven XDC X-Ray disk centrifuge. Mean particle size, and particle size geometric weight standard deviation, are recorded.

As the skilled man will appreciate, the particulate material, which is titanium dioxide, doped titanium dioxide or combinations thereof, is prepared via a process that involves a milling step. A preferred milling step involves the use of a mill selected from fine media mills and sand mills. In such mills fine grinding media, accelerated by means other than gravity, are used to reduce slurried pigment agglomerates to sub micrometer size.

Particles resulting from the milling step are then coated. The particles resulting from the milling step may be coated with a hydrated oxide such as silica, alumina, or zirconia.

The coating of the particulate material, which is titanium dioxide, doped titanium dioxide, or combinations thereof, may be similar to that of conventional pigmentary material, as known in the art. It may therefore involve dispersion of the material in water, following which suitable coating reagents, such as aluminium sulfate, are added. The pH is then adjusted to cause precipitation of the desired hydrated oxide to form a coating onto the surface of the material.

In one embodiment, the coating may involve the addition of suitable coating reagents, such as aluminium sulphate, to an aqueous slurry of the material to be coated; the pH of the aqueous slurry is then adjusted to cause precipitation of the desired hydrated oxide to form a coating on the surface of the titanium dioxide, doped titanium dioxide, or combinations thereof.

Coatings may generally be achieved by addition of suitable salts to the particulate materials at either an acidic pH (e.g. pH from around 1 to 2) or a basic pH (e.g. pH from around 9.5 to 12), with neutralisation to effect precipitation. The salts may firstly be added followed by subsequently adjustment of the pH: alternatively the pH may be adjusted whilst the salt is being added.

After coating formation, the material may be washed and dried before being ground, e.g. in a fluid energy mill or microniser, to separate particles that have been stuck together by the coating and/or drying steps.

At this final milling stage, organic surface treatments, e.g. with polyol, amine, alkyl phosphonic acid or silicone derivatives, may be applied as required.

In one embodiment, the particulate material may be treated to selectively remove particular size fractions. For example, any particles which are 5 µm in diameter or greater may be removed; in one embodiment any particles which are 3 µm in diameter or greater may be removed. Such particles may be removed by, for example, a centrifugation treatment.

The product that is exposed to the sun during use, in the third and fourth aspects, may comprise the coated particulate material in an amount of from 0.5 to 70 vol %, such as from 1 to 60 vol %, e.g. from 2 to 50 vol %.

The level of coated particulate material in the application may be selected appropriately, depending on the intended application.

The product that is exposed to the sun during use, in the third and fourth aspects, may be selected from plastics products (e.g. plastic containers), inks, coating compositions (including paints and powder coating compositions), roofing compositions (for example it may be a shingle, tile, or granular coating) or ground covering compositions (such as a road surface product, flooring product, driveway surface product, car park surface product or pavement surface product), and solar reflective products.

In one embodiment, the product is a paint, and it may comprise the coated particulate material in an amount of from 5 to 50% v/v, such as from 10 to 30% v/v, e.g. from 15 to 20% v/v.

In one embodiment, the product is a plastics product, and it may comprise the coated particulate material in an amount of from 0.5 to 70% v/v; for example in masterbatches levels as high as from 50 to 70% v/v may be possible or desirable, whilst in polythene bags levels as low as from 1 to 3% v/v may be desirable.

In one embodiment, the product is a coating composition for a roofing product or ground covering product and it may comprise the coated particulate material in an amount of from 1 to 50% v/v.

The product that is exposed to the sun during use, in the third and fourth aspects, may in one embodiment further comprise organic or inorganic UV absorbers or scatterers. Examples of such UV absorbers/scatterers include hindered amine light stabilisers (HALS) & ultrafine $TiO_2$.

The preparation of the titanium dioxide or doped titanium dioxide particulate material with an average crystal size of greater than 0.40 µm, may be by standard processes for obtaining such materials, which have been modified such that one or more of the following apply:
 a) the calcining is at a higher temperature than standard, e.g. of 900° C. or higher, such as 1000° C. or higher;
 b) the calcining is for a longer time than standard, e.g. of 5 hours or more;
 c) reduced levels of growth moderators are present during the process; for example it may be that growth moderators are not present during the process;
 d) growth promoters are added during the process; in particular increased levels of growth promoters are added during the process;
 e) the level of rutile seeds in the calciner feed pulp is reduced.

The large crystal material may be treated in the same way as conventional pigments, e.g. with various additions to make it compatible in a paint, plastic, asphalt or other vehicle.

A process for obtaining titanium dioxide or doped titanium dioxide particulate material with an average crystal size of greater than 0.40 µm, may comprise:
 reacting a titaniferous feedstock with sulfuric acid, to form a solid, water soluble reaction cake;
 dissolving the cake in water and/or weak acid to produce a solution of a titanium sulfate;
 hydrolysing the solution in order to convert the titanium sulfate to titanium dioxide hydrate;
 separating the precipitated titanium dioxide hydrate from the solution and calcining to obtain titanium dioxide;
 wherein one or more of the following apply:
 a) the calcining is at a higher temperature, e.g. of 900° C. or higher, such as 1000° C. or higher;
 b) the calcining is for a longer time, e.g. of 5 hours or more;
 c) reduced levels of growth moderators are present during the process; for example it may be that growth moderators are not present during the process;
 d) growth promoters are added during the process; in particular increased levels of growth promoters are added during the process;
 e) the level of rutile seed material is reduced within the calciner feed pulp.

The titanium dioxide particulate material is then coated.

The material is suitably milled prior to the coating stage. Milling is achieved with unusual ease with the large crystal materials of the present invention. Notably, the material may be observed to be broken at practicable milling energies. This may provide an additional preparation option and may also facilitate size control.

The coating may be achieved by dispersion of the material in water, following which suitable coating reagents, such as aluminium sulfate, are added. The pH is then adjusted to cause precipitation of the desired hydrated oxide to form a coating onto the surface of the material.

After coating formation, the material may be washed and dried before being ground, e.g. in a fluid, energy mill or microniser, to separate particles that have been stuck together by the coating. At this final milling stage, organic surface treatments, e.g. with polyol, amine or silicone derivatives, may be applied as required.

In one embodiment, the thus obtained titanium dioxide particulate material may be treated to selectively remove particular size fractions.

In the present specification, "average" refers to the statistical mean unless otherwise stated. Specifically, when referring to average sizes this is intended as a reference to the "geometric volume mean size".

The invention will now be further described, by means of illustration only, by means of the following non limiting examples.

EXAMPLES

In the examples, PVC=pigment volume concentration; pvc=poly vinyl chloride

Example 1A

Production of Large Crystal $TiO_2$ 1.1 Method

A titaniferous feedstock was digested with concentrated sulphuric acid and the cake obtained dissolved to form a black sulphate liquor according to conventional $TiO_2$ pigment methodology. This 'black liquor' was subsequently hydrolysed, according to the Blumenfeld Process, to precipitate hydrous titanium dioxide. To the pulp was added 0.3% Blumenfeld Nuclei (produced, according to the art, by digestion of a portion of the hydrous titanium dioxide described above in concentrated sodium hydroxide solution, and subsequent reaction of the sodium titanate produced with hydrochloric acid.) The pulp was further additioned with 0.05% w/w of $Al_2O_3$ and 0.2% w/w $K_2O$. The additioned pulp was then calcined by ramping the temperature to around 1000° C. at a rate of 1° C./minute. The exact temperature is selected to ensure an anatase level of between 0.1 and 3%. Prior to calcination, manganese sulphate may optionally be used as a dopant at a concentration of <0.2%.

The resultant product was characterized by: i) obtaining an electron micrograph of a rubbed out sample and subsequently analysing the image using a KS300 Image Analyser by Carl Zeiss to obtain the mass average crystal size; and ii) measuring the X-ray diffraction pattern to obtain the % rutile.

1.2 Results

The mean crystal size was found to be 0.79 (with a geometric weight standard deviation of 1.38, measured by transmission electron microscopy followed by image analysis using KS300 by Carl Zeiss). The rutile content was found to be 99%.

Example 1B

Production of Large Crystal $TiO_2$ 1.1 Method a) Production of Starting Material Using Mecklenburg Precipitation A titaniferous feedstock was digested with concentrated sulphuric acid and the cake obtained dissolved in dilute acid to produce a solution of a titanium sulphate. This titanium sulphate was subsequently hydrolysed to precipitate hydrous titanium oxide by the deliberate addition of anatase nuclei ('Mecklenburg' process). This hydrous titanium oxide pulp was used as the starting material.

b) Formation of Large Crystal $TiO_2$ from Starting Material

The pulp was washed and leached. 0.2% $K_2O$ and 0.2% $Al_2O_3$ was added (% wt/wt) to the $TiO_2$. The pulp was then calcined in a rotary kiln. The temperature was increased at a rate of 1° C./min to 1030° C. The sample was then held at 1030° C. for 30 minutes before being allowed to cool.

c) Characterisation

The resultant $TiO_2$ was characterized for size by visual assessment of an electron micrograph and for % rutile by X-ray diffraction.

1.2 Results

The obtained $TiO_2$ had an average crystal size of >0.5 μm, an average particle size of >1 μm, and a % rutile of >99%.

The electron micrograph is shown in FIG. 1.

Example 1C

Production of Large Crystal $TiO_2$ 1.1 Method a) Production of Starting Material Using Mecklenburg Precipitation A titaniferous feedstock was digested with concentrated sulphuric acid and the cake obtained dissolved in a more dilute sulphuric acid solution to produce a solution of a titanium sulphate. This titanium sulphate solution was subsequently heated to precipitate hydrous titanium oxide, the precipitation was nucleated by the addition of fine anatase crystals ('Mecklenburg' process). This hydrous titanium oxide pulp was used as the starting material.

b) Formation of Large Crystal $TiO_2$ from Starting Material

The pulp was filtered and washed. Potassium and aluminium sulphate solutions were then added to the pulp to give 0.2% $K_2O$ and 0.2% $Al_2O_3$ (expressed as % wt/wt on $TiO_2$). The pulp was then dried and calcined in a rotary kiln. During the calcinations the temperature was increased at a rate of 1° C./min to 1030° C. The sample was then held at 1030° C. for 30 minutes before being allowed to cool. Prior to calcination, manganese sulphate may be used as a dopant.

c) Characterisation

The resultant $TiO_2$ was characterized by i) obtaining an electron micrograph of a rubbed out sample and subsequently analysing the image using a KS300 Image Analyser by Carl Zeiss to obtain the mass average crystal size; and ii) measuring the X-ray diffraction pattern to obtain the % rutile.

1.2 Results

The obtained $TiO_2$ had a mass average crystal size of >0.5 μm and a % rutile of >95%.

Example 2

Measurement of Reflectance Spectrum 2.1 Method

The large crystal rutile sample prepared in Example 1B was ball milled into an alkyd paint resin in an amount of 50% wt/wt (20% v/v). After ball milling the paint was drawn down using a number 3 K bar over a black substrate. The reflection over black was recorded with a NIR/vis spectrometer fitted with an integrating sphere.

2.2 Results

The spectrum of the large crystal rutile showed less reflection in the visible (400-700 nm) and more reflection in the NIR (700-2500 nm) compared to available conventional $TiO_2$ pigments.

Figure 2:
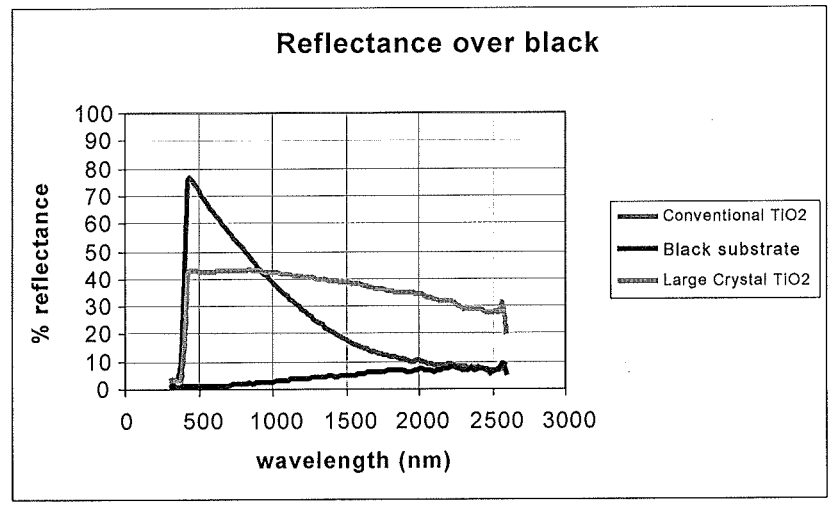
FIG. 2: Graph showing the spectrum of conventional $TiO_2$, large crystal $TiO_2$ made according to Example 2, and black substrate

A graph showing the spectrum of the sample of Example 1B, as well as the spectrum for a conventional $TiO_2$ (TIOX- IDE® TR81 pigment—commercially available from Huntsman Pigments Division) and the black substrate is shown in FIG. 2.

Example 3A

Preparation of Coated Large Crystal TiO$_2$

The TiO$_2$ from Example 1A is first dry milled using a Raymond mill. It is then slurried to 350 gpl and milled for 30 minutes in a fine media mill containing Ottawa sand. The sand is then separated from the slurry.

The resulting slurry (Particle size 0.87: Geometric Weight Standard Deviation 1.44 measured by Brookhaven X-ray disk centrifuge) is then coated with dense silica and alumina. In this regard, the TiO$_2$ slurry is introduced into a stirred tank, the temperature is raised to 75° C. and the pH adjusted to 10.5. 1.0% silica (w/w on TiO$_2$) is added as sodium silicate over 30 minutes and mixed for 30 minutes. Sulphuric acid is added, over 60 minutes, to bring the pH to 8.8 and then over 35 minutes to bring the pH to 1.3. Next, 0.6% alumina is added from caustic sodium aluminate over 25 minutes to bring the pH to 10.25: whereupon it is mixed for 20 minutes. Finally, the pH is adjusted to 6.5 by addition of sulphuric acid. The coated product is then washed and dried before being fluid energy milled.

The IR reflective product is characterised as follows:

Particle Size—The product is subjected to high shear mixing, in the presence of a suitable dispersant, to disperse the particles without comminution. The particle size distribution is measured using a Brookhaven XDC X-Ray disk centrifuge. Mean particle size, and particle size geometric weight standard deviation, are recorded.

Crystal Size—A small sample of the product is dispersed and subjected to shear in any suitable rub-out technique. The resulting paste is dripped onto a microscopy mount and evaporated before being assessed on a JEOL® JEM 1200EX transmission electron microscope. Mean crystal size, and crystal size geometric weight standard deviation, are assessed using Carl Zeiss KS300 image analysis software.

The sample was subjected to accelerated weathering and a durability ratio of 0.68 was measured, using the method described in Example 7.

Example 3B

Preparation of Coated Large Crystal TiO$_2$

Method

The TiO$_2$ from Example 1C is first dry milled using a Raymond mill. It is then slurried to 350 gpl and milled for 30 minutes in a fine media mill containing Ottawa sand. The sand is then separated from the slurry.

The resulting slurry is then coated with dense silica and alumina. In this regard, the TiO$_2$ slurry is introduced into a stirred tank and the pH adjusted to 10.5. 3.0% silica (w/w on TiO$_2$) is added as sodium silicate over 30 minutes and mixed for 30 minutes. Sulphuric acid is added, over 60 minutes, to bring the pH to 8.8 and then over 35 minutes to bring the pH to 1.3. Next, 2.0% alumina is added from caustic sodium aluminate over 25 minutes to bring the pH to 10.25: whereupon it is mixed for 20 minutes. Finally, the pH is adjusted to 6.5 by addition of sulphuric acid.

The coated product is then washed and dried before being fluid energy milled.

Example 4A

Use of Large Crystal TiO$_2$ in Black Paint

The product of Example 1A was evaluated in an acrylic paint system.

Method

A tint concentrate is prepared using an acrylic resin, a wetting & dispersing additive, a solvent and a tint. The tints can be carbon black or an NIR transparent black tint (e.g. BASF® paliogen black tint, S0084).

| Tinter Concentrate Component | % |
|---|---|
| 60% Acrylic Resin (40% solvent) | 78 |
| Solvent | 4 |
| Wetting & Dispersing Additive | 9 |
| Tint | 9 |

This tint concentrate is milled with steel ballotini. From this, a tinted acrylic resin solution is prepared.

| Tinted Acrylic Resin Solution Components | % |
|---|---|
| 60% Acrylic Resin (40% solvent) | 85 |
| Tint Concentrate | 15 |

The pigment under test is added to a portion of the tinted acrylic resin solution to create a millbase. The quantity of pigment is varied to give different pigment volume concentrations (pvc). This tinted acrylic millbase is then milled for 2 minutes and then let down with a further quantity of tinted acrylic resin solution.

The test paint is then applied to an opacity chart using a wire wound applicator; the gauge of which determines the nominal wet film thickness. The solvents are allowed to evaporate and the panel is then stoved at 105° C. for 30 minutes.

Reflectance spectra are measured using a UV/vis/NIR spectrophotometer with an integrating sphere and a wavelength range of 400-2600 nm. Total Solar Reflectance is calculated from this data, according to the method described in ASTM E903. L*, a* & b* under a D65 illuminant, are also calculated from this data.

Figure 3:
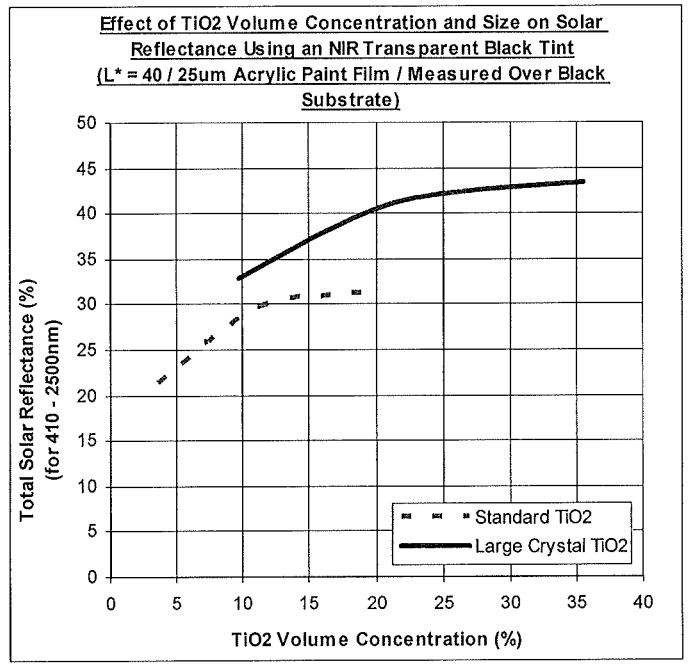
FIG. 3: Graph showing the effect of $TiO_2$ volume concentration and size on solar reflectance using an NIR transparent black tint
Figure 4:
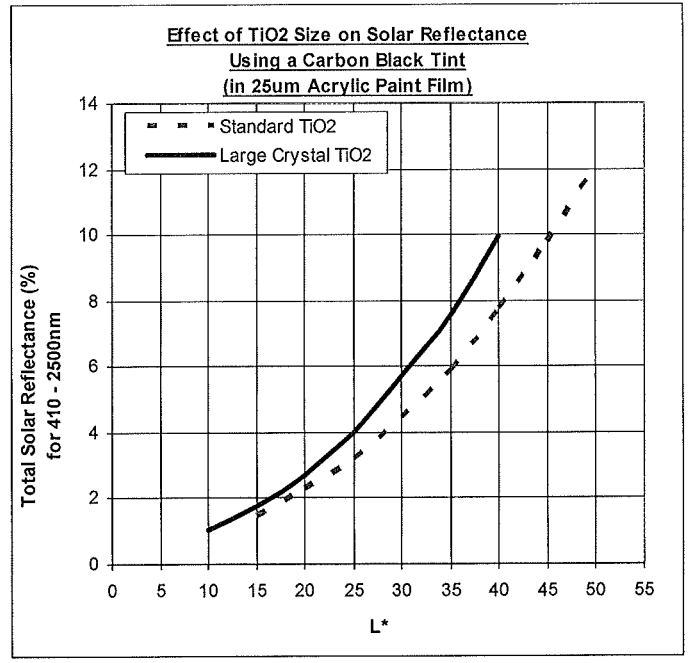
FIG. 4: Graph showing the effect of $TiO_2$ size on solar reflectance using a carbon black tint

The results are shown in FIGS. 3 and 4.

By substituting the values at L* 40 in the Lawrence Berkeley SRI calculator, the following results were obtained for the examples in FIG. 4 (Basis: ASTM1980 specifications)

|  | TSR | SRI | Surface Temperature |
|---|---|---|---|
| Conventional TiO$_2$ | 7.8 | 4 | 354.3 K/178° F. |
| TiO$_2$ (invention) | 10.0 | 6 | 353.2 K/176° F. |

Example 4B

Production of Paint

To produce a coloured paint, the large crystal rutile sample prepared in Example 1B is ball milled into an alkyd paint resin in an amount of about 15% v/v and non-white colorant is added in an amount of about 1% v/v.

Non-white colorants that may be used are:
(i) chrome titanate yellow, (ii) nickel titanate yellow, (iii) perylene black, (iv) synthetic red iron oxide, (v) copper phthalocyanine and (vi) quinacridone red.

Example 4C

Production of Paint

The coated TiO$_2$ from Example 3B is used to prepare an improved paint product. In this regard, the coated large crystal rutile sample prepared in Example 3B is incorporated into an alkyd melamine formaldehyde based paint in an amount of about 23% v/v.

Durability is measured in an Atlas C165a WEATHEROM-ETER® instrument and is assessed as mass loss over 2000 hours' exposure.

Example 5

Benefits in PVCu when Using a Complex Inorganic Coloured Pigment

PVC plaques were prepared with a range of titanium dioxide & Pigment Green 17 concentrations such that the total pigment volume concentration remained constant.
Initial PVC Formulation:

| Component | grams per 100 g resin |
| --- | --- |
| PVC Resin | 100 |
| Ca/Zn Stabilizer | 5 |
| Acrylic Impact Modifier | 6 |
| Acrylic Processing Aid | 1.5 |
| Calcium Carbonate | 6 |
| TiO$_2$ | 5 |

PG17 replacement of TiO$_2$ to maintain constant pigment volume:

| TiO$_2$/(TiO$_2$ + PG17) | 100% | 75% | 50% | 25% | 0% |
| --- | --- | --- | --- | --- | --- |
| TiO$_2$ * (g) | 6.30 | 4.73 | 3.15 | 1.58 | 0.00 |
| Hematite (g) | 0.00 | 2.03 | 4.08 | 6.15 | 8.19 |

Figure 5:
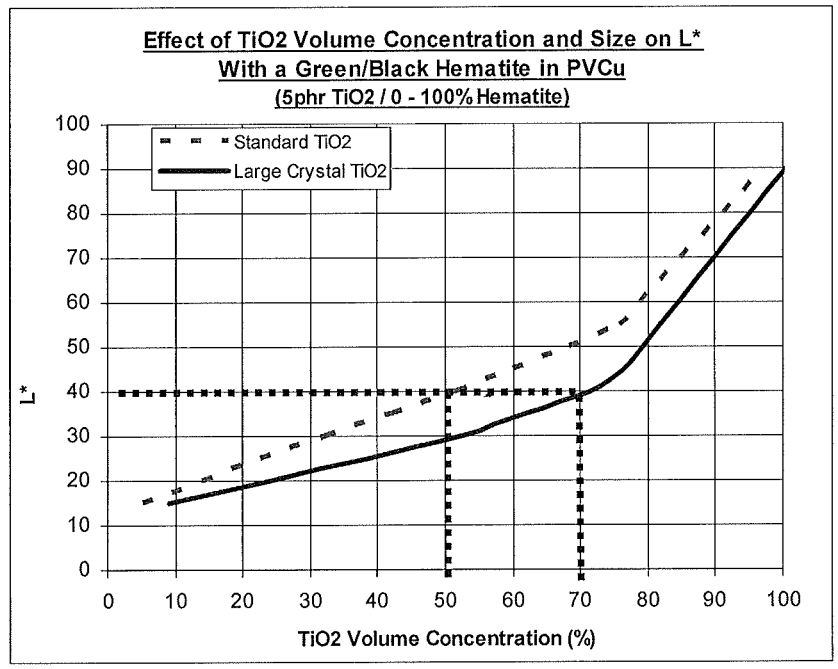
FIG. 5: Graph showing the effect of $TiO_2$ volume concentration and size on L* with a green/black hematite in PVCu

The experiment is conducted for each of two types of TiO$_2$: conventional pigmentary TiO$_2$ and the material obtained using the method of Example 1A. This material used had a mean crystal size of 0.97 microns and a mean particle size of 0.85 microns (having been milled through its crystal size).
pvc plaques are prepared as follows:
  A dry blend is prepared using a crypto-peerless type mixer.
  A J.R.Dare two-roll mill (155° C. front & 150° C. rear roller) is used to produce pvc.
  The resultant pvc is preheated for 3 minutes @ 165° C. then pressed for 2 minutes @15 te/in$^2$.
Reflectance spectra are measured using a UV/vis/NIR spectrophotometer with an integrating sphere and a wavelength range of 400-2600 nm. Total Solar Reflectance is calculated from this data, according to the method described in ASTM E903. L*, a* & b*, under a D65 illuminant, are also calculated from this data. The results are shown in FIGS. 5 and 6.

The graphs demonstrate that the titania of the invention exhibits lower visible tint reduction enabling a higher concentration to be used to achieve a given L*, relative to conventional titanium dioxide. As a result a higher concentration may be used, giving improved Solar Reflectance at a given L*.

Figure 6:
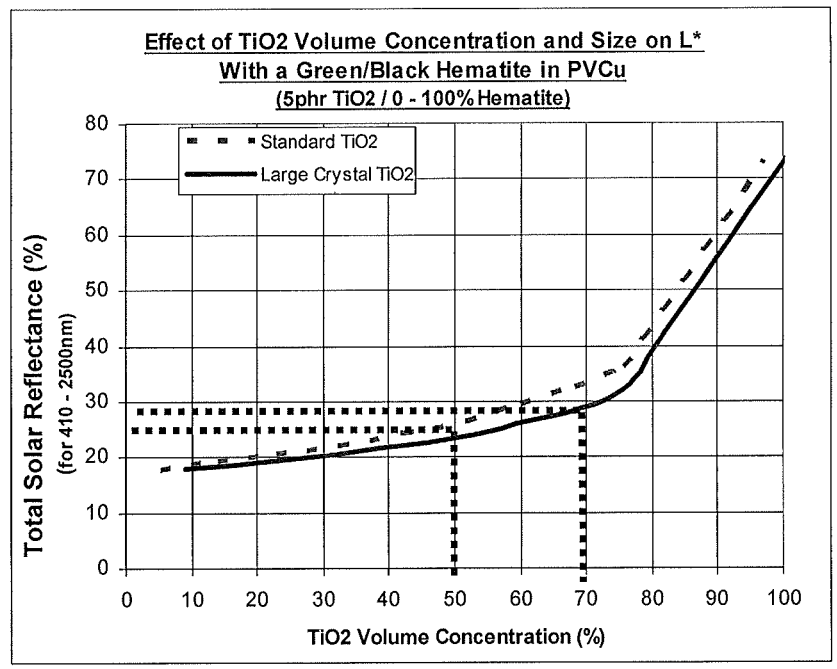
FIG. 6: Graph showing the effect of $TiO_2$ volume concentration and size on total solar reflectance with a green/black hematite in PVCu

Using the values at L* 40 in the Lawrence Berkeley SRI calculator the following results were obtained for the examples in FIG. 6 (Basis: ASTM1980 specifications)

|  | L* | TiO$_2$:Black | TSR | SRI | Surface Temperature |
| --- | --- | --- | --- | --- | --- |
| Conventional TiO$_2$ | 40 | 50:50 v:v | 24.7 | 25 | 346.1 K/163° F. |
| TiO$_2$ (invention) | 40 | 70:30 v:v | 28.5 | 30 | 344.3 K/160° F. |

Example 6

Benefits in a Carbon Black Tinted PVC-u

PVC plaques are prepared with a range of volume ratios (titanium dioxide:carbon black). TiO$_2$ parts per hundred resin is fixed at 5%, carbon black varied to give phr of 0.100%, 0.050%, 0.010% & 0.005%.

The experiment is conducted for each of two types of TiO2: conventional pigmentary TiO$_2$ and material obtained by the method of Example 1A.
Initial PVC Formulation:

| Component | phr (parts per hundred resin) |
| --- | --- |
| PVC Resin | 100 |
| Ca/Zn Stabilizer | 5 |
| Acrylic Impact Modifier | 6 |
| Acrylic Processing Aid | 1.5 |
| TiO$_2$ | 5 |

Figure 7:
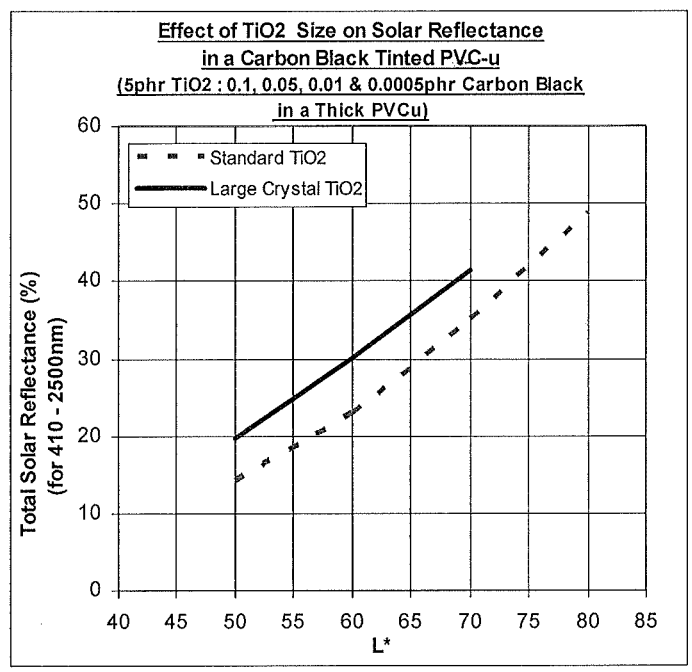
FIG. 7: Graph showing the effect of $TiO_2$ size on total solar reflectance in a carbon black tinted PVC-u

A dry blend is prepared using a crypto-peerless type mixer.
A J.R.Dare two-roll mill (155° C. front & 150° C. rear roller) is used to produce PVC.
The resultant PVC is preheated for 3 minutes @ 165° C. then pressed for 2 minutes @15 te/in$^2$.
The results are shown in FIG. 7.

|  | L* | TSR | SRI | Surface Temperature |
| --- | --- | --- | --- | --- |
| Conventional TiO$_2$ | 60 | 23.1 | 23 | 346.9 K/165° F. |
| TiO$_2$ (invention) | 60 | 30.0 | 32 | 343.5 K/159° F. |

Example 7

Durability Benefits in Stoved Alkyd Melamine Formaldehyde Paint

The millbase below is ballmilled for 16 hours.

| Millbase Component | Mass (g) |
| --- | --- |
| TiO$_2$ Pigment | 68.0 |
| 15% Alkyd Resin | 28.0 |
| 8 mm Glass Ballotini | 170 |

The millbase is stabilised by the addition 15 g of 60% commercial alkyd resin and trundled for 30 minutes. After trundling, further additions are made: 24.3 g of 60% alkyd resin and 15.3 g of 60% commercial melamine formaldehyde resin. The resulting paint is trundled for a further 30 minutes before being decanted and left to de-aerate for 15 minutes.

A degreased steel panel is weighed and the paint under test is spin-applied to the front of the test panel. The paints are allowed to flash-off for a minimum of 60 minutes before stoving for 30 minutes at 150° C. Sufficient paint is applied to give a dry film thickness of at least 40 μm. The panels are then reweighed.

Panels are exposed for a total of 3000 hours in an Atlas Ci65a WEATHEROMETER® instrument, being removed every 250 hours for measurement before being returned to the weatherometer for further exposure.

For the test pigment, mass-loss at each measurement time is plotted against the corresponding points for a standard pigment. Least-squares fitting is used to determine the slope, which is the Durability Ratio, DR. Lower DR is preferred: indicating superior resistance to weathering.

Figure 8:
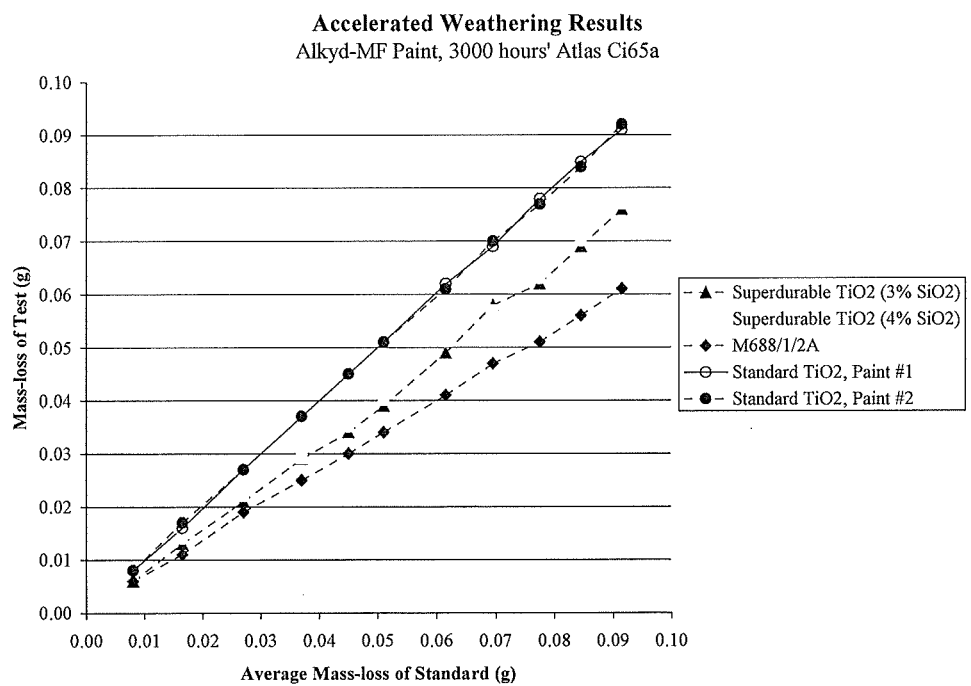
FIG. 8: Accelerated weathering results for paints made with test pigments according to Example 7

The results are shown in FIG. 8 and in the table below.

| Pigment | Description | DR |
|---|---|---|
| Standard $TiO_2$ | Alumina-zirconia coating | 1.00 |
| *Superdurable$TiO_2$ | Dense silica coating (3% $SiO_2$) | 0.81 |
| *Superdurable$TiO_2$ | Dense silica coating (4% $SiO_2$) | 0.82 |
| M688/1/2A | Milled to 0.69 micron, dense silica coating (3% $SiO_2$) | 0.67 |

*Commercial conventional $TiO_2$ grades

The invention claimed is:

1. A coated particulate material, wherein:
   (i) the material is selected from the group consisting of titanium dioxide, doped titanium dioxide and combinations thereof;
   (ii) the material has an average crystal size of from 0.40 μm to 2.0 μm and a particle size distribution such that 30% or more of the particles are less than 1 μm; and
   (iii) the coating comprises two or more oxide materials, wherein one of the oxide materials is a dense silica material and wherein one of the oxide materials is an oxide of one or more elements which are:
      (a) group 4 (IVB) and 12 (IIB) transition metals selected from the group consisting of Ti, Zr and Zn and/or
      (b) group 13 to 15 (IIIA-VA) p-block elements selected from the group consisting of Si, Al, P and Sn and/or
      (c) lanthanides,
   wherein the coated particulate is substantially white.

2. The coated particulate material of claim 1, wherein the coated particulate material is provided in a coloured composition comprising:
   the coated particulate material as NIR scattering particulate material; and
   one or more non-white colorant;
   wherein the particulate material and the non-white colorant are dispersed within a vehicle.

3. The coated particulate material of claim 2, wherein the coating that comprises two or more oxide materials has an oxide material selected from the group consisting of $Al_2O_3$, $ZrO_2$, $CeO_2$, and $P_2O_5$ as one of the oxide materials.

4. The coated particulate material of claim 1, wherein the coated particulate material is not provided in a coloured composition comprising:
   the coated particulate material as NIR scattering particulate material; and
   one or more non-white colorant;
   wherein the particulate material and the non-white colorant are dispersed within a vehicle.

5. The coated particulate material of claim 1, wherein the coated particulate material is NIR scattering particulate material.

6. A product comprising the coated particulate material of claim 1.

7. The product of claim 6 wherein the product is selected from the group consisting of plastics products, inks, paints and other coating compositions, roofing compositions, ground covering compositions and solar reflective products.

8. The product of claim 6, wherein the product further comprises organic or inorganic UV absorbers or scatterers.

9. The product of claim 6 wherein the coating for the particles comprises a layer comprising an oxide of Si and a layer comprising an oxide of Al.

10. The product of claim 6 wherein the particulate material has an average crystal size from 0.50 μm to 2.0 μm.

11. The product of claim 6 wherein the product has a lightness value L* of greater than 95, with a value of a* of less than 5 and a value of b* of less than 5.

12. The product of claim 6 wherein at least one of the oxide materials is coloured and wherein said at least one coloured oxide material included in the particulate material is present in an amount of 0.5 wt % or less.

13. The product of claim 6 wherein the particulate material has an aspect ratio of less than 4:1.

* * * * *